United States Patent Office 2,877,252
Patented Mar. 10, 1959

2,877,252

HEAVY METAL CONTAINING AZINE PIGMENTS

Delton W. Hein, Somerville, Robert J. Alheim, Middlesex, and Nena K. Barabutes, Highland Park, N. J., assignors to American Cyanamid Company, New York, N. Y., a corporation of Maine No Drawing. Application June 8, 1956
Serial No. 590,111

5 Claims. (Cl. 260—438)

This invention relates to a process for the preparation of heavy metal compounds of azines. More particularly, it relates to a process for the formation of water insoluble heavy metal chelates of azines of the structure:

HO—R=A=R—OH in which the R is an aromatic ylidene radical to which the hydroxyl is attached in a positon adjacent to the ylidene group, and A is selected from the group consisting of =N—N= and

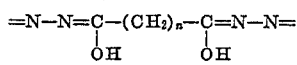

in which $n$ is a whole number greater than minus one, which comprises the copper chelate of 2-hydroxy-1-heavy metal salt of a fatty acid in the presence of an N-alkylamide of a fatty acid. This invention also relates to a new brown pigment of extraordinary properties which comprises the copper chelate of 2-hydroxy-1-naphthaldazine.

The azines derived from orthohydroxy aromatic aldehydes and ketones are known. Likewise, azines are known which are derived from orthohydroxy aromatic ketones and alkanedioldials. These compounds may be represented by the formulas:

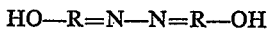
and
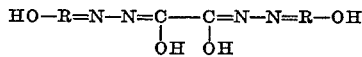

in which R is as defined above. In the second of these classes, the specific use of ethan-diol-dial is illustrated, but it is to be understood that longer chain alkan-diol-dials are equally usable. Such lake forming azines and bis-azines are readily hydrolyzed into their original components, i. e., the aldehyde or ketone and hydrazine. Since they are highly colored, if they were stabilized, e. g., by metallization, they would form the basis of a new class of pigments. Such a class has been attempted by several investigators, but the process which has to be used produces hydrated or ammoniated metal derivatives of uncertain stability and therefore, unusable as pigments.

We have found that the process of chelation can be carried out very readily when a metal salt of a fatty acid is heated with the hydroxyarylyazine in the presence of an N-alkylamide of a fatty acid. Contrary to previous experiments in the field of pigments such a process produces directly a product of pigmentary size usable as a pigment without any further conditioning or other after treatment. This is a great advantage in the process of our invention. Pigments are formed by a great many reactions, but almost invariably it is necessary that the pigment be given what is known as a conditioning treatment in order to change its particle size to that range known as pigmentary size, at which the greatest color values are obtained. Such conditioning procedures usually eschew the use of organic solvents, since organic solvents tend to recrystallize the pigment by growing crystals much larger than pigmentary size. It is greatly surprising to discover that a metal chelate pigment can be formed directly in an organic solvent in particle sizes of pigmentary order of magnitude.

The azines which form the starting material of our process are formed by the condensation of hydrazine and its salts, or the hydrazide of a dibasic aliphatic acid with an aromatic aldehyde or a ketone possessing a hydroxyl group ortho to the said carbonyl. Examples of the aromatic aldehydes and ketones which can be used in such a preparation include, for example; 2-hydroxy-1-benzaldehyde; 2-hydroxy-5-bromobenzaldehyde; 2-hydroxy-3,5-dibromobenzaldehyde; 2 - hydroxy-3,5-dichlorobenzaldehyde; 2-hydroxy - 3,5 - dinitrobenzaldehyde; 2-hydroxy-5-nitro-1-benzaldehyde; 1-hydroxy-2-naphthaldehyde; 2-hydroxy - 1 - naphthaldehyde; 2-hydroxy-3-naphthaldehyde; isatin; 6-hydroxyquinoline-5-aldehyde; 2 - hydroxycarbazole-1-aldehyde; 6-chloro-3-hydroxy-4-methylthianaphthene - 2 - aldehyde; 4-hydroxyquinaldine-3-aldehyde; 2,3-dimethyl-4-hydroxy-1-phenyl-5-pyrazolone; 3-hydroxy-1-benzopyrrole - 2 - aldehyde; 2-hydroxy-1-benzopyrrole-3-aldehyde, and the like.

The hydrazides of organic dibasic acids which may be used to form the bis-azines usable as starting materials in the process of our invention include such compounds as oxalyldihydrazide; succinoyldihydrazide; adipoyl dihydrazide, and the like. The condensation is carried out by heating in a solvent. Examples of these hydroxyazines are, for example, that prepared from hydrazine and 2-hydroxy-1-naphthaldehyde which has the structure:

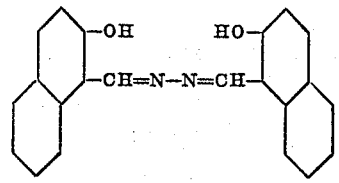

or the bis-azine derived from oxyalyldihydrazide and isatin which has the structure:

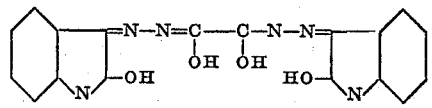

For the formation of chelates, it is preferable that the metallizable group ortho to the azine be a hydroxyl, although other lake forming groups such as alkoxy, acetyl, mercapto, methylthio, carboxyl, oxyacetic acid and the like are known. In the case of bis-azines, the product although derived from the dihydrazide of the dibasic acid is in an enol form and is named as a derivative of a diol-dial to indicate that fact.

The chelatable azines and bis-azines which form the starting material of our invention, are readily hydrolyzable into their original components. However, when chelated they become stable. Chelation puts one metal atom in the molecule for each azine grouping. Thus, it takes two metal atoms to metallize the bis-azines described. The metals used to form the complexes, are those of atomic numbers 24–30; namely, chromium, manganese, iron, cobalt, nickel, copper and zinc. These are usually used in the form of their acetates, although the formates and propionates or other fatty acid salts may equally well be used. The acetates are preferred because of more ready availability. The metal salt is used in amounts varying from the theoretical amount up to excesses of as much as 50%. Some excess is usually needed in order to make certain complete metallization. Beyond that, excessive usage of the metal salt is mere waste.

The chelation is carried out in the presence of an N-alkyl amide of a fatty acid at elevated temperatures. Since it is usually carried out under atmospheric pressure, we prefer those N-alkyl amides which are liquid at convenient working temperatures for the reaction and isolation of the product. Examples of these are the mono- and dimethylformamides; the mono- and diethylformamides; the mono- and dipropylformamides; the mono- and dimethylacetamides; and the mono- and dipropylacetamides; the mono- and dimethylpropionamides; the mono- and diethylpropionamides and the mono- and dipropylpropionamides. The preferred medium is N-dimethylformamide, or as it is alternatively named, formyldimethylamine. This compound has great solvent properties, not only for the unchelated azines but for the metal salts used to make the chelates. Furthermore, it is miscible with water and many other solvents in all proportions, and is thus easily washed out of the product.

When the other metallization procedures known to the prior art are used to prepare these azine chelates, the products are unsatisfactory pigments. Metallization in aqueous media give incompletely chelated products. When an alcohol-ammonia metallization is used, the products have dirtier and bluer print and tint tones. When other organic solvents such as alcohol, nitrobenzene, chlorobenzene or pyridine are used, the products are lighter, milkier, weaker in print tone, less light fast and less transparent pigments. The process of our invention, employing a media composed of an N-alkylated amide, gives pigments of superior strength, stability and transparency.

In the practice of our invention, the azine is usually heated with a metal acetate in formyldimethylamine at temperatures of 110–125° C. until chelation is complete. Separation of the chelate is completed by the addition of a small amount of water. While some chelation takes place at room temperature, the reaction is most effective when higher temperatures are used, and the product is more easily isolated. Since the N-alkyl fatty acid amides have high boiling points, they lend themselves admirably to higher temperatures of reaction. The chelation rate varies with the azine used. In some cases, it is so immediate that it is possible to run a continuous process, whereas, with others it is necessary to heat for several hours to effect a complete reaction.

Another aspect of our invention is the hitherto unknown copper chelate of 2-hydroxy-1-naphthaldazine. This compound is an outstanding pigment. It contains one atom of copper per azine group, but it is believed to be a molecule in which 2 mols of chelated azine are co-ordinated.

This pigment is foremost among organic pigments in resistance to bleed in xylol and butanol. Its rich chocolate brown color and very good light fastness make it a very valuable addition to a line of pigment colors. Its strength is good in all binders and its stability to acid and alkali is similar to the most stable metallized azo pigments; it combines with this an excellent transparency. It is very effective in the coloring of cellulose acetate and other cellulose organic acid esters, where compatibility and fastness to light are important. Such colored cellulose derivatives are not only valuable for molded plastics, but are important to lacquers for wood furniture and panel finishes, and as films and prints on metal foil, containers, and, in general, wherever resistance to oil, alcohol and gasoline is a factor. It is further useful in coloring other plastics. When used with alkyd resins, they make superior automotive finishes especially, in melamine alkyd resin compositions. It can also be used in the conventional manner for effective light fast brown shade in inks, in coloring rubber, in pigment printing of textiles and in the coloring of substrates in general.

Our invention can be illustrated by the following examples in which parts are by weight unless otherwise specified.

Example 1

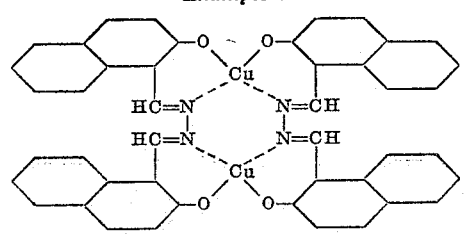

To 474 parts of formyldimethylamine are added 9 parts of cupric acetate monohydrate. Heat is applied until a solution of 110–115° C. is obtained. To this solution, 10.2 parts of the yellow azine of 2-hydroxy-1-naphthaldehyde, prepared as in PB Report 385, page 53, are added with stirring and the resulting solution of azine is stirred until chelation is substantially complete. The copper chelate of the azine precipitates as formed. The mixture is then cooled to room temperature and the brown copper chelate is isolated by filtration, washed with formyldimethylamine and water and dried. It is insoluble in water, benzene, xylol and butanol.

Example 2

If in place of copper acetate, salts of other heavy metals capable of complex formation are used in the procedure of Example 1, there are formed pigments of deep shades insoluble in formyldimethylamine. The following table shows the amount and the metal salt to be substituted in the procedure of Example 1 and the resulting pigment obtained.

| Chelate Prepd. | Amount of Metal Salt Used | Chelated Azine Obtained |
|---|---|---|
| Ni+2 | 11.2 parts Ni(OCOCH$_3$)$_2$.4H$_2$O | Yellow-brown. |
| Cr+3 | 9.4 parts Cr(OCOCH$_3$)$_3$ | Reddish-brown. |
| Fe+2 | 8.94 parts FeCl$_2$.4H$_2$O | Black-brown. |

Example 3

To 470 parts of acetylethylamine are added 9 parts of cupric acetate monohydrate and the mixture heated to 110–115° C. With the temperature maintained at this level, 10.2 parts of the yellow azine of 2-hydroxy-1-naphthaldehyde is added with stirring. The resultant mixture is stirred until chelation is substantially complete. The temperature is then reduced and the brown copper chelate of the azine is isolated by filtration, washed with water and dried.

Example 4

The cupric chelate of the azine of 2-hydroxy-1-naphthaldehyde, prepared in Example 1, 1.0 part, is incorporated in 1.5 parts of No. 1 Lithographic varnish containing a standard drier, by mulling in a Hoover Automatic Muller 2×100 revolutions with 150 pounds pressure. A rub-out on paper discloses it to be a medium to dark-brown full-tone color which reduces with white (50 parts ZnO paste to 1 part pigment paste) to a reddish tan tint. The print tone withstands 200 Fade-Ometer hours. It is highly transparent.

Example 5

The cupric chelate of the azine of 2-hydroxy-1-naphthaldehyde prepared in Example 1, 36.5 parts is ground in a ball mill with 80 parts of Rezyl 387–5 (an alkyd resin) and 62.5 parts of xylol. Weathered panels are prepared by thinning with xylol and spraying metal panels which are then baked at 275° F. for 45 mintues. In resistance to weather exposure, the panels are equal to the best in their color field.

Example 6

The cupric chelate of the azine of 2-hydroxy-1-naphthaldehyde prepared in Example 1, 0.45 part is ground with 10% cellulose acetate solution in acetone for 24 hours. The product is drawn down on a glass slab. The test shows a very satisfactory dispersion and a somewhat yellower shade on drying compared to Examples 3 and 4. The dry films have excellent light fastness.

*Example 7*

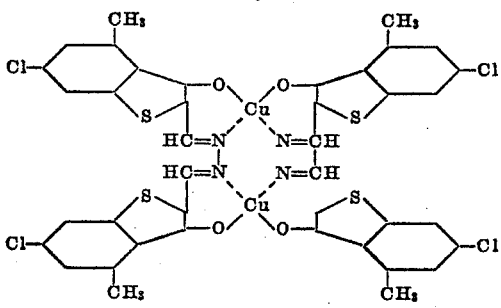

To a solution of 8.0 parts of cupric acetate monohydrate in 237 parts of formyldimethylamine at 115° C. is added 4.5 parts of the bright orange azine of 6-chloro-3-hydroxy-4-methyl-thianaphthene-2-aldehyde, prepared by the procedure of Example 1 of U. S. 1,807,693. Chelation starts immediately. The mixture is stirred at about 115° C. until chelation is complete. It is then cooled to 80° C. and poured, with stirring, into 3000 parts of cold water. The dark brown Cu II chelate of the azine is permitted to settle. The water is decanted and the product isolated by filtration, washed with water until the washings are free of copper and the washed pigment is then dried. It is believed to have the above structure.

*Example 8*

To a solution of 10.0 parts of nickel acetate tetrahydrate in 237 parts of formyldimethylamine at 115° C. is added 4.5 parts of the bright orange azine of 6-chloro-3-hydroxy-4-methyl-thianaphthene-2-aldehyde. The mixture is stirred at about 115° C. until the chelation is substantially complete, cooled and poured into cold water with stirring. The water is then decanted, the nickel chelate is of the azine isolated by filtration, washed with water and dried. The dry product is a black powder, which is believed to have a structure similar to that of Example 7, except that nickel replaces copper.

*Example 9*

To a solution of 8.8 parts of zinc acetate dihydrate in 237 parts of formyldimethylamine at 115° C. are added 4.5 parts of the bright orange azine of 6-chloro-3-hydroxy-4-methylthianaphthene-2-aldehyde. The mixture is stirred at 110–120° C. until chelation is complete. It is then cooled to 80° C. and poured into 3000 parts cold water. After decantation of the water, the zinc chelate of the azine is isolated by filtration, washed thoroughly with water and dried. In its dry state it is a brick red powder which has a structure similar to that of Example 7 with zinc replacing copper.

*Example 10*

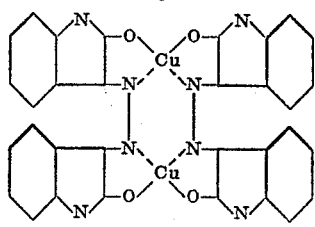

To a solution of 16.0 parts of copper acetate monohydrate in 237 parts of formyldimethylamine, at 125° C. is added with stirring, 11.6 parts of the red isatin azine prepared as in Ber., 54, 2844 (1921). Chelation starts immediately. The mixture is stirred at 125° C. until chelation is complete. The pigment is allowed to settle and is isolated by decating the supernatant liquid, and filtering the remaining pigment. The dark brown product obtained is washed with water and then dried. It is usable directly as a pigment without a conditioning step.

*Example 11*

Instead of 16.0 parts of copper acetate monohydrate, 19.6 parts of nickel acetate tetrahydrate is used in the procedure of Example 10. A chocolate brown pigment is obtained.

*Example 12*

If, in Example 10, instead of 16.0 parts of copper acetate monohydrate, 17.6 parts of zinc acetate dihydrate is used, a brick red product is obtained.

*Example 13*

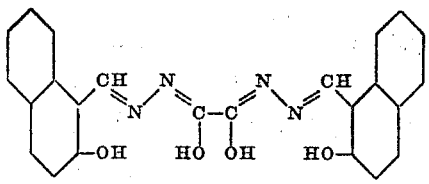

To 17.2 parts of 2-hydroxy-1-naphthaldehyde in 203 parts of boiling ethyl alcohol are added 1.151 parts of 21.5% sulfuric acid solution and a boiling solution of 5.9 parts of oxaldihydrazide in 100 parts water. The mixture is heated at reflux with stirring until the reaction is complete. The bright greenish yellow fluorescent bisazine is then isolated by filtration, washed with alcohol and dried.

*Example 14*

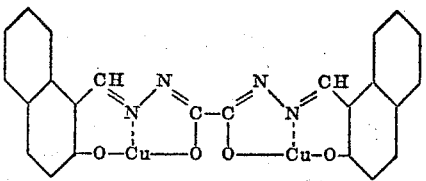

To a solution of the 4 parts of cupric acetate monohydrate in 190 parts of formyldimethylamine at 115° C. is added 4.3 parts of the bisazine prepared in Example 13. The mixture is heated at 110–115° C. with stirring until chelation is complete. It is then poured into 2000 parts of water, allowed to settle, isolated by decantation and filtration, washed with water and dried. The product is a chocolate brown solid having the above formula.

When 5.0 parts of nickel acetate tetrahydrate or 6.6 parts of zinc acetate dihydrate are used instead of the cupric acetate monohydrate the corresponding orange brown nickel chelate and orange zinc chelate are formed. These are all usable directly, without conditioning, as pigments.

*Example 15*

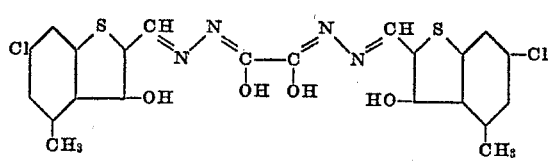

To 22.7 parts of 6-chloro-3-hydroxy-4-methylthianaphthene-2-aldehyde in 407 parts of boiling ethyl alcohol under reflux is added 1.151 parts of 21.5% sulfuric acid solution and a solution of 6.0 parts of oxaldihydrazide in 500 parts of boiling water. The mixture is then stirred under reflux until the reaction is complete. The bright orange bis-azine is isolated by filtration, washed with alcohol and water and dried.

Example 16

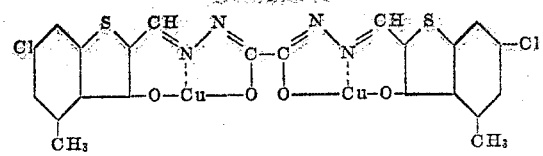

To a solution of 8.0 parts of cupric acetate monohydrate in 237 parts of formyldimethylamine at 110° C. is added 5.4 parts of the bisazine prepared in Example 15. The mixture is stirred and heated at 110–120° C. until reaction is complete. The reaction mixture is then poured into 3000 parts of cold water and the chelated product allowed to settle. The chelated product is then isolated by filtration, washed with water and dried. It is a dark brown powder having the above formula.

When 10 parts of nickel acetate tetrahydrate or 8.8 parts of zinc acetate dihydrate are used in place of the cupric acetate monohydrate, the corresponding black nickelous chelate and dark-red-brown zinc chelate are formed.

Example 17

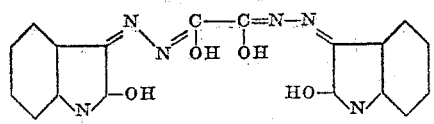

A mixture of 14.7 parts of isatin, 5.9 parts of oxaldihydrazide, 81 parts of alcohol, 50 parts water and 0.115 part of sulfuric acid in the form of 21.5% sulfuric acid solution is heated at reflux with stirring until reaction is substantially complete. It is then permitted to cool and is then filtered. The bright orange bisazine is washed with water and alcohol and dried.

Example 18

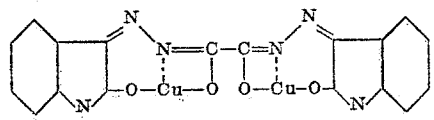

To a solution of 6 parts of cupric acetate monohydrate in 190 parts of formyldimethylamine is added 3.8 parts of the orange bisazine prepared in Example 17. The mixture is stirred at 115° C. for several hours and then drowned in 2000 parts of cold water. The chelated product is allowed to settle. Then it is isolated by filtration, washed with cold water and dried. The dark brown powder has the above structure.

When 7.5 parts of nickel acetate tetrahydrate in 190 parts of formyldimethylamine, 6.6 parts of zinc acetate dihydrate in 142 parts of formyldimethylamine, or 7.5 parts of cobaltous acetate tetrahydrate in 142 parts of formyldimethylamine is substituted for the above usages, the corresponding dark brown nickel chelate, rust colored zinc chelate or red brown cobalt chelate are formed.

Example 19

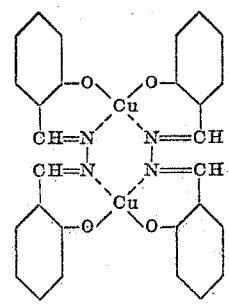

The procedure of Example 1 is followed using the 2-hydroxy-1-benzaldazine, prepared as described in J. Prakt. Chem., 85, 393 (1912) in an equivalent amount to the usage of 2-hydroxy-1-naphthaldazine. The product is a brown solid of the above formula.

Example 20

The procedure of Example 1 is used replacing the formyldimethylamine with acetyldipropylamine. The product of Example 1 is isolated in a manner similar to that used in that example.

We claim:
1. The process of producing metal chelates of 2-hydroxy-1-naphthaldazine, which comprises heating said azine with a lower alkanoic acid salt of a metal of atomic number 24 to 30 in a medium consisting essentially of an N-(lower alkyl)-amide of a lower fatty acid.
2. The process of claim 1 in which the lower fatty acid amide is formyldimethylamine.
3. The process of claim 2 in which the fatty acid salt of the metal is the acetate.
4. The process of claim 2 in which the metal salt is copper acetate.
5. A product of the process of claim 1.

References Cited in the file of this patent

Chemical Abstracts, vol. 42, col. 4864, citing Iowa State College Jour. Sci., vol. 22, pp. 110–125 (1947).
Chemical Abstracts, vol. 47, col. 1532 citing Zhur Anal Khim, vol. 7, pp. 120–127 (1952).
Jour. Prakt. Chemie, vol. 145, pp. 243–256 (1936).
Analytical Chemistry, vol. 26, #8, p. 1345 (1954).
Collection of Czechoslovak Chem. Comms., vol. XV, #5–6, pp. 267–274 (1950).
Jour. Pharm. Soc. Japan, vol. 72, pp. 1162–1164 (1952).